US010562753B2

(12) United States Patent
Valles et al.

(10) Patent No.: US 10,562,753 B2
(45) Date of Patent: Feb. 18, 2020

(54) PRESSURISED LIQUID DISPENSER WITH THREE WAY VALVE FOR VENTING A CONTAINER

(71) Applicant: Anheuser-Busch InBev S.A., Brussels (BE)

(72) Inventors: Vanessa Valles, Leuven (BE); Daniel Peirsman, Leuven (BE); Stijn Vandekerckhove, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 160 days.

(21) Appl. No.: 15/532,088

(22) PCT Filed: Nov. 30, 2015

(86) PCT No.: PCT/EP2015/078028
§ 371 (c)(1),
(2) Date: May 31, 2017

(87) PCT Pub. No.: WO2016/087353
PCT Pub. Date: Jun. 9, 2016

(65) Prior Publication Data
US 2017/0267511 A1    Sep. 21, 2017

(30) Foreign Application Priority Data
Dec. 1, 2014    (EP) .................................. 14195625

(51) Int. Cl.
*B67D 1/08*    (2006.01)
*B67D 1/04*    (2006.01)
(Continued)

(52) U.S. Cl.
CPC ......... *B67D 1/0848* (2013.01); *B67D 1/0004* (2013.01); *B67D 1/0462* (2013.01);
(Continued)

(58) Field of Classification Search
CPC ........... B67D 2001/0093–0094; B67D 1/0848; B67D 1/0004; B67D 1/04; B67D 1/0462;
(Continued)

(56) References Cited

U.S. PATENT DOCUMENTS 3,654,962 A * 4/1972 Fredd .................... F16K 3/0254
                                                            137/625.11
4,534,377 A    8/1985 Ducros
(Continued)

FOREIGN PATENT DOCUMENTS

EP    2 146 832    10/2008
EP    2 148 770    10/2008
(Continued)

*Primary Examiner* — Paul R Durand
*Assistant Examiner* — Andrew P Bainbridge
(74) *Attorney, Agent, or Firm* — Levy & Grandinetti

(57) ABSTRACT

A device for dispensing liquid from a container includes a dispensing tube to dispense the liquid through a dispensing valve. A gas tube feeds pressurized gas into the container. The upstream end of the gas tube connects to a source of pressurized gas. A three way valve is coupled to the downstream end of the gas tube. The three way valve includes a keg duct in communication with the interior of the container, a gas duct connected to the downstream end of the gas tube, and a vent duct. The three way valve can switch from a dispensing position in which the keg duct is in communication with the gas duct, and out of communication with the vent duct, to a venting position in which the keg duct is in fluid communication with the vent duct and out of fluid communication with the gas duct.

15 Claims, 10 Drawing Sheets

(51) Int. Cl.
*F16K 11/085* (2006.01)
*B67D 1/00* (2006.01)

(52) U.S. Cl.
CPC ......... *B67D 1/0839* (2013.01); *B67D 1/0845* (2013.01); *F16K 11/0856* (2013.01); *B67D 2001/0094* (2013.01)

(58) Field of Classification Search
CPC .. B67D 1/0829; B67D 1/0839; B67D 1/0845; B67D 1/0878; F16K 11/0856
USPC .............................................. 222/399, 400.7
See application file for complete search history.

(56) References Cited

U.S. PATENT DOCUMENTS

| 5,240,144 | A | * | 8/1993 | Feldman | B67D 1/0001 222/105 |
| 5,657,911 | A | | 8/1997 | Mogler et al. | |
| 6,070,624 | A | * | 6/2000 | Bilbrey | B67D 1/0829 137/625.19 |
| 8,496,139 | B2 | * | 7/2013 | Nishino | B67D 1/04 222/113 |
| 2004/0134939 | A1 | * | 7/2004 | van der Klaauw | B67D 1/0829 222/400.7 |
| 2009/0069934 | A1 | * | 3/2009 | Newman | B67D 1/0021 700/239 |
| 2010/0191106 | A1 | * | 7/2010 | Koyama | A61M 39/223 600/431 |
| 2012/0187153 | A1 | * | 7/2012 | Burge | B67D 1/0462 222/386.5 |

FOREIGN PATENT DOCUMENTS

| EP | 2 148 771 | 10/2008 |
| EP | 2 152 494 | 10/2008 |
| EP | 2 719 656 | 4/2014 |
| EP | 14161266 | 9/2015 |
| EP | 14181401 | 2/2016 |
| WO | WO 99/52814 | 10/1999 |
| WO | WO 2014/057099 | 4/2014 |

* cited by examiner

PRESSURISED LIQUID DISPENSER WITH THREE WAY VALVE FOR VENTING A CONTAINER

TECHNICAL FIELD

The present invention relates to pressure driven dispensing appliances for dispensing a liquid, in particular a beverage such as a carbonated beverage like beer or a malt fermented beverage contained in a container. It concerns in particular a three way valve allowing the control of the pressure inside a container.

BACKGROUND FOR THE INVENTION

Draught (or draft) beer or malt based fermented beverages (collectively referred to herein as "beer") is often preferred by consumers to bottled or canned beer. Draught beer is generally served at the counter of a public house or restaurant out of a refrigerated keg. The keg is connected to a source of pressurized gas in order to increase the pressure inside the keg and thus drive the dispensing of the beer through a dispensing tube fluidly connecting the keg to a dispensing tap, comprising a valve for controlling the flow out of said tap.

Draught beer was—and still widely is—traditionally stored in large capacity re-usable metal kegs, typically 50 l kegs (=11 Imperial gallons). Once the kegs are empty, they are returned to the brewer for cleaning and filled with new beer. In recent years, however; a reduction of the kegs capacity offered on the market has been observed. There are two main factors explaining this trend.

First, brewers have developed various solutions for offering draught beer to individuals with specifically designed home appliances. It is clear that if 50 l kegs can be emptied reasonably rapidly in a public house (=pub) or a restaurant, this is not the case for home appliances. Hence, smaller kegs of the order of 2, 3.5, 6, or 12 litre capacity were developed. Such home appliances are often referred to as "table top dispensers" because they are small enough to stand on top of a table.

Second, even in pubs, the tastes of the consumers have shifted from traditional lager beers towards special beers, with more specific flavours. This diversification of the types of beers offered for consumption in pubs has pushed brewers to store their special beers in smaller capacity kegs, ranging from 10 to 25 l kegs. Since such kegs are too large to stand on top of a counter, and probably too small to justify storing them in a basement far away from the tap, they are usually stored directly under the tapping column, usually in a refrigerated chamber or closet. For this reason and by opposition to the expression "table top dispensers", such dispensing systems used in pubs are often referred to as "under the counter dispensers".

With smaller kegs, collecting, cleaning, sterilizing, re-filling and re-distributing metal kegs becomes too expensive and has a substantial ecological impact. For this reason, containers (or kegs) made of polymer, e.g., in polyester such as PET, have been developed which are totally recyclable, thus considerably reducing the ecological impact and cost of packaging draught beer. Particular examples of polymeric kegs are so-called bag-in-containers, wherein the keg comprises an outer container which is relatively rigid and mechanically stable, and an inner bag, which is flexible and contains the beer to be dispensed (cf. FIG. 2). Dispensing of the beer out of a bag-in-container is driven by injecting pressurized gas between the outer container and the inner bag, thus squeezing the latter and expelling the content of the inner bag out into a dispensing tube. One major advantage of bag-in-containers is that the pressurizing gas does not contact the liquid to be dispensed, and a simple compressor or pump can be used, instead of the traditional $CO_2$ pressure bottles. Examples of polymeric bag-in-containers can be found in EP2146832, EP2148770, EP2148771, EP2152494.

As is often the case in fields having a well established tradition, this change of keg format and materials is, at least in a first stage, implemented by simple replacement of the large metal keg by polymeric kegs, generally smaller in size, without changing any of the other auxiliary elements of the dispensing appliances, such as keg connectors, tubing, storing closet for storing the kegs, etc. New keg connectors and storing closets particularly suitable for polymeric kegs of smaller format have been recently proposed in European patent applications No EP14181401 and EP14161266.

Collecting metal kegs in a cycle of cleaning and re-using them has quite different demands than collecting polymeric kegs for recycling of the polymeric material. For example, the polymeric kegs are advantageously squeezed prior to transportation so as to reduce the volume of empty kegs, when this is of course out of question with metal kegs meant to be re-used. It is therefore problematic to squeeze an empty container which interior is pressurized, as more energy is required to overcome the inner pressure, and when the inner pressure is released it can be unpleasant, if not dangerous, as it can be accompanied by a sudden burst.

It can be seen from this review of the prior art, that it remains a need in the art for a dispensing appliance which is better adapted for use with the new generation of smaller, polymeric kegs, which are meant for recycling instead of re-using. This and other objects of this invention will be evident when viewed in light of the drawings, detailed description, and appended claims.

SUMMARY OF THE INVENTION

The present invention is defined in the appended independent claims. Preferred embodiments are defined in the dependent claims. In particular, the present invention concerns a dispensing appliance for dispensing a liquid contained in a container, comprising:
  (a) A dispensing tube for dispensing the liquid from the container through a dispensing valve, said dispensing tube comprising an upstream end and a downstream end;
  (b) A gas tube for feeding a pressurized gas into the container for driving the dispensing of liquid out of the container through the dispensing tube, said gas tube comprising a downstream end and an upstream end, the latter being connectable to a source of pressurized gas;
Characterized in that, a three way valve is coupled to the downstream end of the gas tube, said three way valve comprising:
  A keg duct suitable for being brought into fluid communication with the interior of the container;
  A gas duct connected to the downstream end of the gas tube; and
  A vent duct;
and in that, the three way valve can switch from a dispensing position wherein the keg duct is in fluid communication with the gas duct, and out of fluid communication with the vent duct, to a venting position, wherein the keg duct is in fluid communication with the vent duct, and out of fluid communication with the gas duct.

In a particularly advantageous embodiment, the dispensing appliance further comprising a keg connector comprising a dispensing channel suitable for being coupled in fluid communication with the upstream end of the dispensing tube, and comprising a gas channel suitable for being coupled in fluid communication with the keg duct of the three way valve. Both dispensing channel and gas channel are suitable for being coupled to a mouth of a container such that the interior of the container is brought in fluid communication with the dispensing tube and with the gas tube, respectively. In a preferred embodiment, the keg duct comprises coupling means for reversibly coupling the three way valve to the gas channel of the keg connector. Said fastening means can be selected from a screwing thread, a bayonet, a snap fit, or a flexible tube portion with a tightening bridle.

The three way valve may advantageously comprise a rotating mandrel pierced by a channel comprising two openings, said rotating mandrel being rotatingly and snugly mounted in a cavity of a housing, and wherein switching of the three way valve from the dispensing position to the venting position is carried out by rotation about a rotation axis, $X1$, of said rotating mandrel with respect to the housing. In this embodiment, the channel must have a geometry such that by rotation of the rotating mandrel about the rotation axis, $X1$, by a given angle, the rotating mandrel position is switched between:

fluidly communicating the keg duct with the gas duct, thus defining the dispensing position, and fluidly communicating the keg duct with the vent duct, thus defining the vent position.

In the foregoing embodiment, it is particularly advantageous if the gas duct of the three way valve extends transverse to the rotation axis, $X1$, and can rotate about said rotation axis, $X1$. This can be achieved, e.g., with a housing ($1h$) comprising, a static portion comprising the vent duct and a gas opening, and a rotating portion comprising the gas duct, wherein the rotating portion can rotate about the rotation axis, $X1$, with respect to the static portion, With such housing, the three way valve preferably comprises, an annular gap extending about the rotation axis, $X1$, and being in fluid communication with the gas duct, and a bridging channel fluidly communicating the annular gap with a gas opening provided in the static portion of the housing, wherein said gas opening can be brought into fluid communication with the channel of the mandrel by rotation of the mandrel to its dispensing position.

When a keg connector is used, it is preferred that said keg connector comprises clamping means for coupling the keg connector to a container, said clamping means being actuated by actuating means from a coupling position, wherein the keg connector is coupled to the container to an release position, wherein the keg connector can be removed from the container. The three way valve is preferably provided with blocking means, such that when the three way valve is in its dispensing position, said blocking means interact with a coupling element such that the clamping means of the keg connector cannot be brought from their coupling position to their release position before switching the three way valve from its dispensing position to its venting position to thus release the blocking means from the coupling element.

The dispensing appliance preferably comprises a container containing a liquid to be dispensed and a mouth sealed by a closure comprising at least one opening allowing to bring an interior of the container in fluid communication with both the upstream end of the dispensing tube and the gas duct of the three way valve, the upstream end of the gas tube being connected to a source of pressurized gas.

The present invention also concerns a method for loading and unloading a container (9) onto a dispensing appliance as defined supra, comprising the following steps:

(a) Providing a container containing a liquid to be dispensed and a mouth sealed by a closure comprising at least one opening;

(b) Bringing the upstream end of the dispensing tube in fluid communication with an interior of the container through said at least one opening of the closure, with the dispensing valve being in a closed position preventing any flow of liquid therethrough;

(c) Bringing the gas duct of the three way valve in fluid communication with an interior of the container (9), and connecting the upstream end of the gas tube to a source of pressurized gas;

(d) Switching the three way valve to its dispensing position to allow pressurized gas to flow into an interior of the container; and (e) Opening the dispensing valve to dispense the liquid out of the container through the dispensing tube.

It is preferred to use a keg connector as discussed supra. The foregoing method thus preferably comprises the steps of:

(b1) coupling the upstream end of the dispensing tube (21) to the dispensing channel (11d) of the keg connector;

(c1) coupling the gas duct (1g) of the three way valve to the gas channel (11g) of the connector; and (c2) coupling the keg connector (11) to the mouth of the container such that both dispensing channel and gas channel bring the interior of the container in fluid communication with the dispensing tube and with the gas tube, respectively.

After use, the container can be removed from the dispensing appliance by:

(f) Switching the three way valve from its dispensing position to its venting position to allow the pressure inside the container to drop in balance with the atmospheric pressure, and (g) Removing the container from the dispensing appliance.

If a keg connector is used, it may be removed prior to removing the container from the dispensing appliance.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 1:
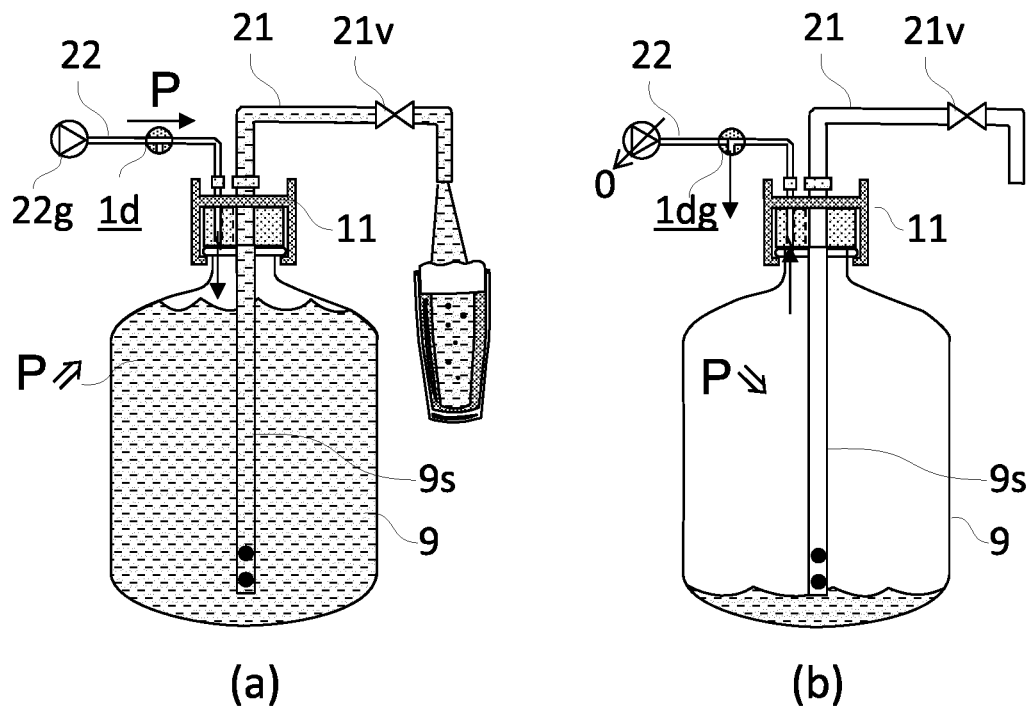
FIG. 1: illustrates a dispensing appliance comprising a three way valve as defined in the present invention used with a single wall keg using a dispensing spear (a) before use, (b) after emptying of the keg.
Figure 2:
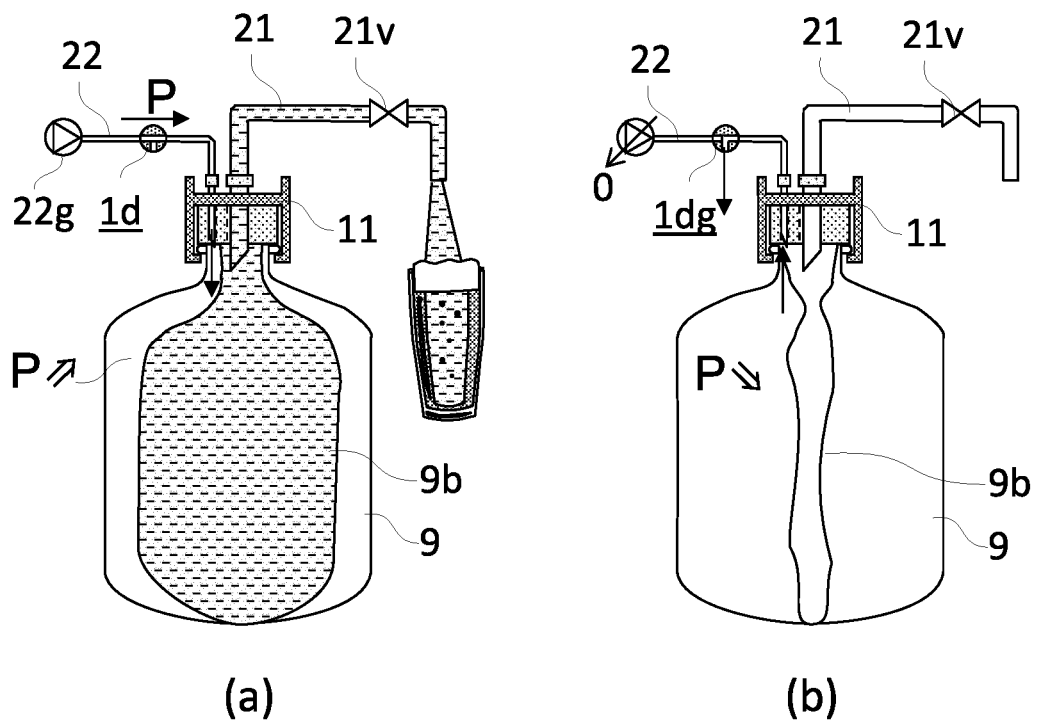
FIG. 2: illustrates a dispensing appliance comprising a three way valve as defined in the present invention used with a bag-in-container (a) before use, (b) after collapsing and emptying the inner bag.
Figure 11:
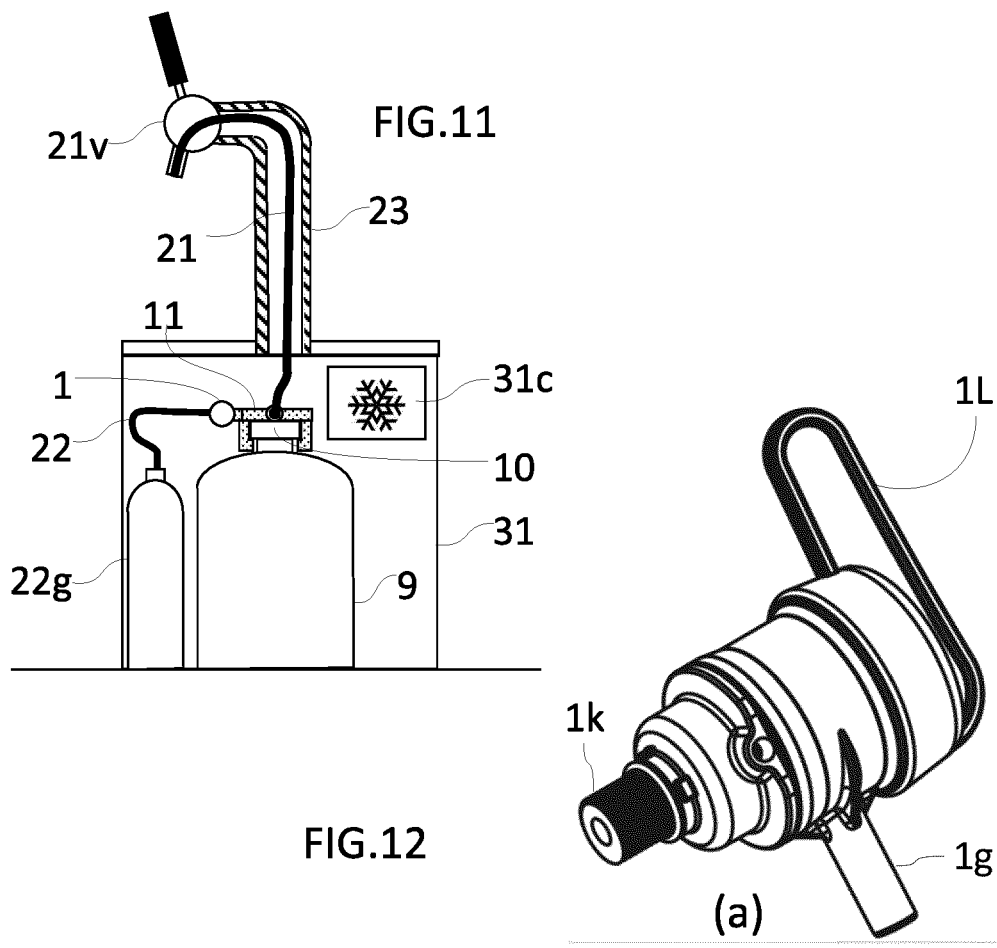
FIG. 11: illustrates an embodiment of dispensing appliance comprising a three way valve as defined in the present invention.

As shown in FIGS. 1, 2, and 11, a dispensing appliance according to the present invention comprises:
(a) A dispensing tube (21) for dispensing the liquid from the container through a dispensing valve (23v); said dispensing tube comprises an upstream end and a downstream end; and
(b) A gas tube (22) for feeding a pressurized gas into the container for driving the dispensing of liquid out of the container through the dispensing tube (21), said gas tube comprising a downstream end and an upstream end, the latter being connectable to a source of pressurized gas (22g); The source of pressurized gas can be a bottle of pressurized gas such as $CO_2$ or $N_2$ or, alternatively, it can be a pump or compressor feeding compressed air. The latter is possible only with liquids which are not sensitive to contact with air, or with containers of the type bag-in-container, wherein there is no contact between the pressurized air and the liquid contained in the inner bag.

The downstream end of the gas tube (22) is coupled to a three way valve (1). Said three way valve comprises:
  A keg duct (1k) suitable for being brought into fluid communication with the interior of the container;
  A gas duct (1g) connected to the downstream end of the gas tube; and
  A vent duct (1v)
As can be well appreciated in FIG. 3, the three way valve can switch from a dispensing position (1d) wherein the keg duct is in fluid communication with the gas duct (1g), and out of fluid communication with the vent duct (1v), to a venting position (1dg), wherein the keg duct (1k) is in fluid communication with the vent duct (1v), and out of fluid communication with the gas duct (11g).

The use of a three way valve coupled to the downstream end of the gas tube is highly advantageous when using polymeric containers which are not meant for being used again but, which are instead meant for being recycled. Indeed, in traditional metal kegs meant for re-use once the liquid contained therein has been dispensed, the empty metal kegs are simply un-coupled from the dispensing tube and gas tube, and removed from the dispensing appliance with the interior of the kegs still pressurized by the pressurized gas used for driving the dispensing of the liquid originally contained therein. This also requires the use of a valve which seals the interior of the keg when uncoupling the dispensing tube and gas tube. The use of such valve in a disposable polymeric keg is detrimental to the cost of the keg. Furthermore, it is advantageous to collapse the empty polymeric kegs prior to shipping them to a recycling facility in order to reduce the volume during transportation. This has, of course, never been a concern up to date, with re-usable metal kegs.

It is preferred to use a keg connector (11) to easily and swiftly couple both dispensing tube (21) and gas tube (22) to a container in a single movement. A keg connector (11) suitable for the present invention may comprise a dispensing channel (11d) suitable for being coupled in fluid communication with the upstream end of the dispensing tube (21), and comprising a gas channel (11g) suitable for being coupled in fluid communication with the keg duct (1k) of the three way valve. Both dispensing channel and gas channel are suitable for being coupled to a mouth of a container such that the interior of the container is brought in fluid communication with the dispensing tube and with the gas tube, respectively. Examples of keg connectors suitable for the present invention are disclosed in WO2014057099, and patent application No EP14181401 and EP14161266.

With single wall kegs, as illustrated in FIG. 1, which function like traditional metal kegs, both dispensing channel (11d) and gas channel (11g) of the keg connector are brought in fluid communication with a same volume of the interior of the keg. The dispensing duct (11d) must be prolonged with a hollow spear (9s) extending down to the bottom of the keg with openings to dispense the liquid remaining at the bottom of the keg. By "extending down to the bottom of the keg", it is meant to extend where the last drops of the liquid will gather upon use. This depends of course on the orientation of the keg during use. In many cases, the kegs are stored standing upright as shown in FIG. 1, but they can be stored horizontally. In this case, the spear (9s) must be curved or simply flexible enough such that the end thereof contacts the lateral wall of the keg, where the last drops of liquid will be found. The gas channel (11g) generally opens at the head space above the level of the liquid contained in the container. When the level of liquid drops below the lowest opening of the spear (9s) the keg is considered empty and can be removed. When gas enters into the hollow spear, foam is formed. This should be avoided and therefore indicates the end of use of the keg which should be considered as empty.

With bag-in-containers, as illustrated in FIG. 2, the dispensing channel is brought in fluid communication with the interior of the inner bag (9b) containing the liquid to be dispensed. No spear (9s) is required here, because the collapse of the inner bag eliminates any headspace. The gas channel (11g) does not open at the interior of the inner bag (9b) but in the space defined between said inner bag (9b) and the outer container (9). This way, the pressurizing gas never contacts the liquid contained in the inner bag, and air pressurized with a simple compressor can be used instead of a pressurized $CO_2$ or $N_2$ bottle. After complete collapse of the inner bag (9b), the bag-in-container is empty and can be removed.

Contrary to current practice, however, prior to removing the keg connector the pressure inside the container is reduced by turning the three way valve (1) from dispensing position (1d) to venting or degassing position (1dg), bringing the pressurized inner volume of the container in fluid communication with atmosphere, in order to bring the pressure inside the container to atmospheric pressure. Once vented, the keg connector (11) can be removed as traditionally performed, and the empty keg can be replaced by a new one. The spent container can be squeezed to reduce volume for transportation to a recycling facility.

The three way valve (1) can be permanently fixed to an upstream end of the gas channel (11g) of a keg connector (11). Since the three way valves of the present invention can be produced at a very low cost, lower than the keg connectors, however, it can be advantageous to not permanently fix them to the keg connectors, in case they should get damaged before the latter. It is therefore preferred that the keg duct (1k) comprises coupling means for reversibly coupling the three way valve to the gas channel (11g) of the keg connector (11). Said fastening means can be selected from a screwing thread, a bayonet, a snap fit, a flexible tube portion with a tightening bridle, or any other means known in the art for rapidly and safely coupling two ducts together.

Figure 4:
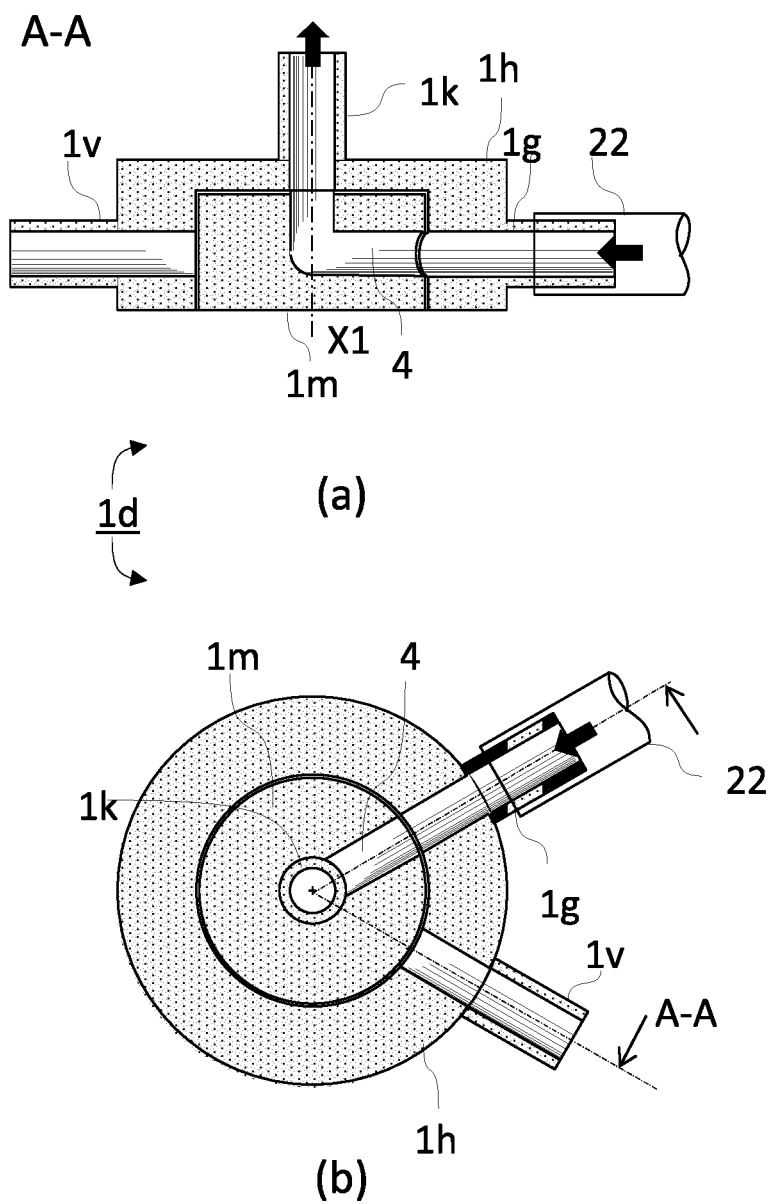
FIG. 4: illustrates an alternative embodiment of three way valve as defined in the present invention in dispensing position (a) side cut view along plane A-A, and (b) top cut view.
Figure 5:
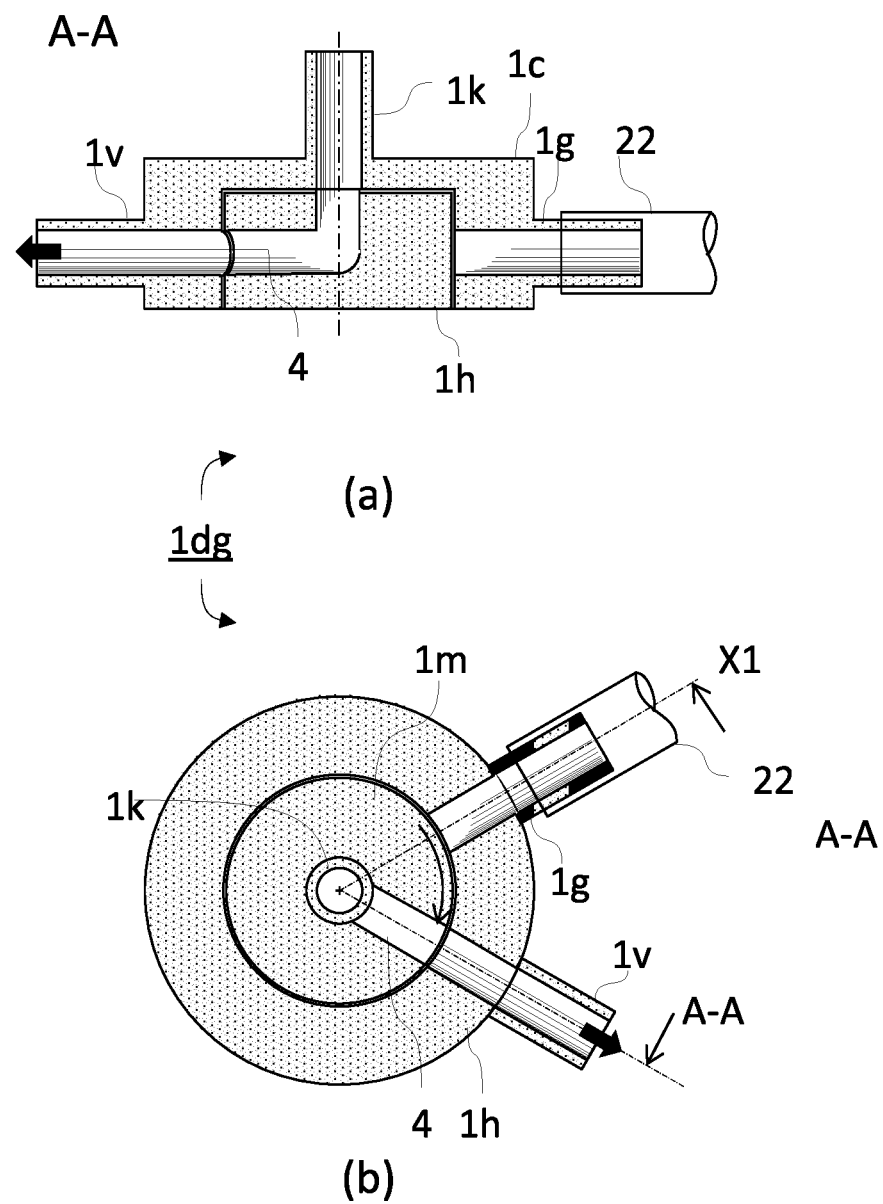
FIG. 5: illustrates the three way valve of FIG. 4 in venting position (a) side cut view along plane A-A, and (b) top cut view.
Figure 6:
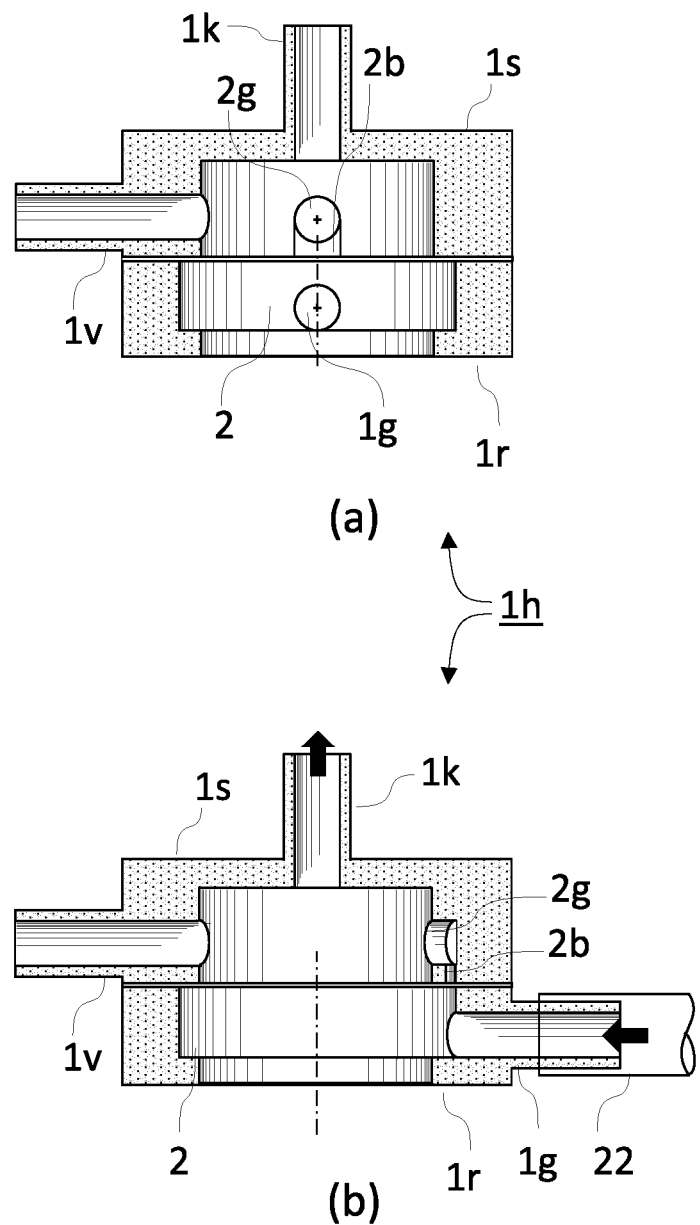
FIG. 6: illustrates a side cut view of an embodiment of a housing of a three way valve as defined in the present invention allowing the rotation of the gas duct (a) along a first plane, and (b) along a second plane normal to the first plane.

As shown in FIGS. 3 to 10 and 12, in a preferred embodiment the three way valve comprises a rotating mandrel (1m) pierced by a channel (4) comprising two openings and rotatingly and snugly mounted in a cavity of a housing (1h). An example of housing is illustrated in FIG. 6. By rotating said rotating mandrel (1m) about a rotation axis, X1, with respect to the housing (1h) the three way valve can easily be switched from the dispensing position (1d) to the venting position (1dg) (compare (a) & (b) of FIG. 3, FIGS. 4 & 5, and FIGS. 7 & 8 which show three way valves in dispensing position and venting position, respectively). The channel (4) has a geometry such that by rotation of the rotating mandrel about the rotation axis, X1, by a given angle, the two openings of the channel (4) are brought in registry with the keg duct, gas duct and vent duct such that the three way valve can be switched between fluidly communicating the keg duct (1k) and gas duct (1g), thus defining the dispensing position (1d), and fluidly communicating the keg duct (1k) and the vent duct (1v), thus defining the vent position (1dg).

Figure 3:
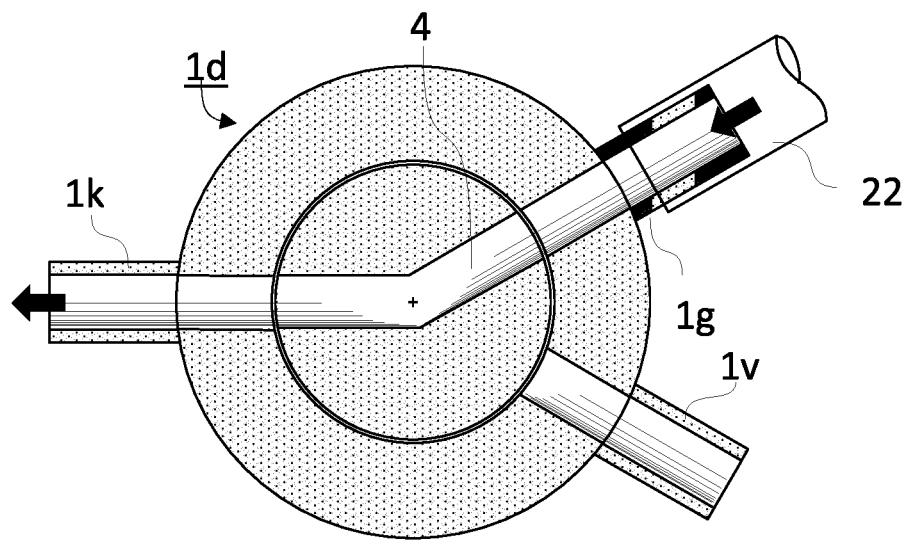
FIG. 3: illustrates a top cut view of an embodiment of three way valve as defined in the present invention (a) in dispensing position, and (b) in venting position.
Figure 3:
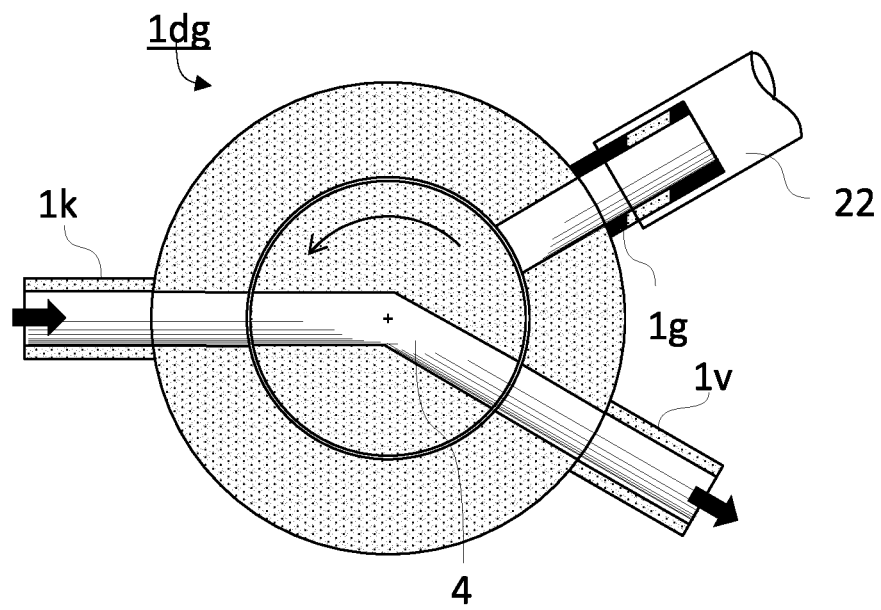

In FIG. 3 the three ducts: keg duct (1k); gas duct (1g) and vent duct (1v) are disposed around, and extend radially from a cylindrical wall of the housing (1h) of the three way valve. The channel (4) forms an angle, a, and the three way valve can be switched from dispensing position (1d) to venting position (1dg) by rotation of the rotating mandrel (1m) by an angle, α. In order to help the user to rotate the mandrel by the correct angle, notches and matching protrusions may be disposed at appropriate positions (not shown in the Figures) to "click" the mandrel (1m) into the desired angular position.

In FIGS. 4 & 5 and 7 & 8, the keg duct (1k) is oriented coaxially with the rotating axis, X1, of the rotating mandrel (1m). This configuration leaves total freedom for choosing the angle between the vent duct (1v) and the gas duct (1g), both extending radially with respect to the same rotation axis, X1. The angle between the vent duct (1v) and the gas duct (1g) determines the rotation angle of the mandrel (1m) required for the three way valve to switch from the dispensing position (1d) to the venting position (1dg) and return.

Figure 7:
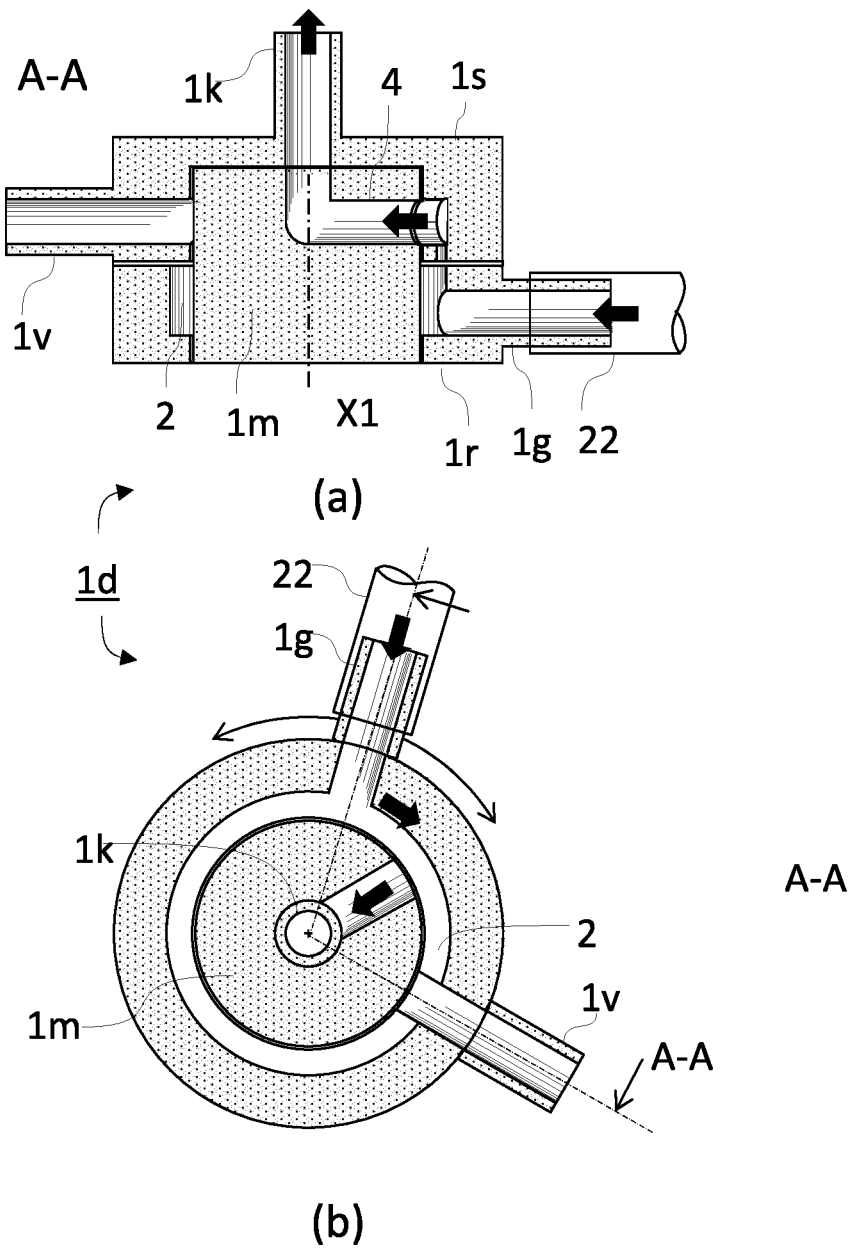
FIG. 7: illustrates an alternative embodiment of three way valve as defined in the present invention in dispensing position, allowing the rotation of the gas duct and comprising the housing illustrated in FIG. 6: (a) side cut view along plane A-A, and (b) top cut view.
Figure 8:
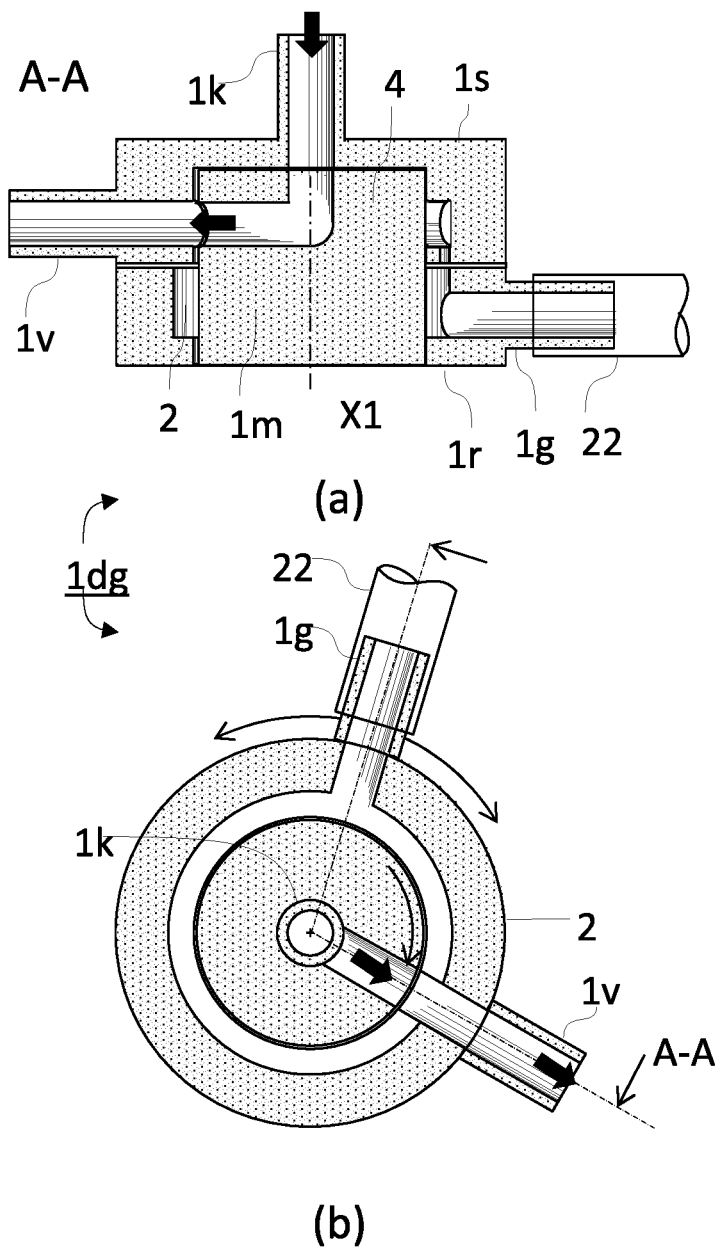
FIG. 8: illustrates the three way valve of FIG. 7 in venting position (a) side cut view along plane A-A, and (b) top cut view.

The three way valve embodiment illustrated in FIGS. 7 & 8 is particularly preferred because the gas duct (1g) of the three way valve, which extends transverse (radially with respect) to the rotation axis, X1, can rotate about said rotation axis, X1. This is particularly advantageous as it permits to prevent any sharp angle and kink from forming in the gas tube (22) which could lead to a premature degradation thereof. Indeed, since the gas duct (1g) can freely rotate about the rotation axis, X1, it can adopt the best configuration for the gas tube (22) to hang loose without any stress. The rotation of the gas duct (1g) can be obtained by using a housing (1h) of the type depicted in FIG. 6, comprising two distinct portions:

a static portion (1s) comprising the vent duct (1v) and a gas opening (2g) and, in the embodiment of FIGS. 6 to 8, also comprising the keg duct (1k) extending coaxially with the rotation axis, X1, (but it could also extend radially as in FIG. 3); and a rotating portion (1r) comprising the gas duct (1g), wherein the rotating portion can rotate about the rotation axis, X1, with respect to the static portion, In this embodiment, the three way valve also comprises, an annular gap (2), quite visible in FIG. 6 showing the housing (1h); extending about the rotational axis, X1, and being in fluid communication with the gas duct (1g), and a bridging channel (2b) fluidly communicating the annular gap (2) with the gas opening (2g) provided in the static portion (1s) of the housing (1h), wherein said gas opening (2g) can be brought into fluid communication with the channel (4) of the mandrel (1m) by rotation of the mandrel (1m) to its dispensing position (1d).

Thanks to the annular gap in the rotation portion (1r) of the three way valve, the gas duct is permanently in fluid communication with the gas opening (2b) regardless of the angular position of the gas duct. The gas opening (2b) can then be brought in registry with the channel (4) of the mandrel (1m) by rotation of the latter (compare FIG. 7 showing the three way valve in its dispensing position (1d) and FIG. 8 showing the same three way valve in its venting position (1dg).

The same result of a rotating gas duct (1g) can also be obtained by using a three way valve according to FIG. 3 or 4 & 5, wherein the keg duct (1k) is either, coupled to a keg or to a keg connector with coupling means allowing rotation of the keg duct (1k), and therefore of the three way valve, or rotatably mounted to the three way valve.

Figure 12:
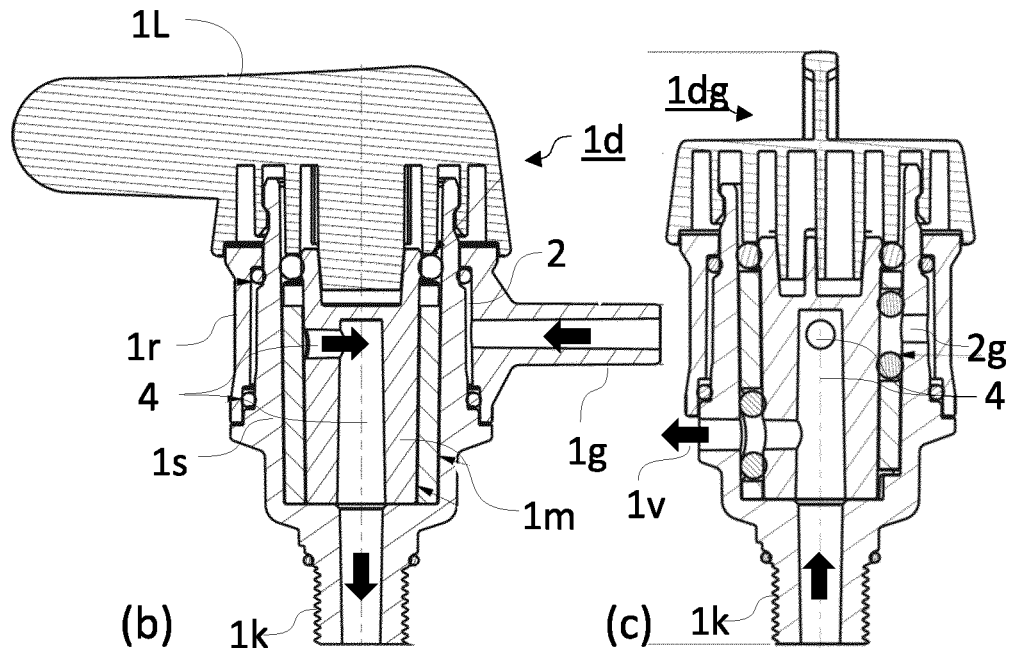
FIG. 12: shows a three way valve as defined in the present invention (a) perspective view, (b) side cut view along a first plane, and (c) side cut view along a second plane normal to the first plane.

FIG. 12 shows another embodiment of a three way valve wherein, as with the three way valve illustrated in FIGS. 7 & 8, the gas duct (1g) is mounted such that it can rotate about the rotation axis, X1. In this embodiment, the gas duct (1g) is rotatably mounted on the housing (1h) by means of a rotating ring (1r) circumscribing a static portion (1s) of the housing. An annular gap (2) between the ring (1r) and the static portion (1s) of the housing ensures that pressurized gas can be brought into fluid communication with the channel (4) of the rotating mandrel (1m) when the three way valve is switched to its dispensing position, regardless of the angular position of the gas duct (1g). Sealing means such as O-rings are illustrated in FIG. 12 (not shown in the other Figures) to ensure gas tightness between any two adjacent components of the three way valve. Switching between a dispensing position and a venting position is actuated by rotating the lever (1L) which is rigidly coupled to the rotating mandrel (1m). The keg duct (1k) is provided with a thread suitable for coupling it to a keg connector (11) or directly to a keg closure (10).

Figure 9:
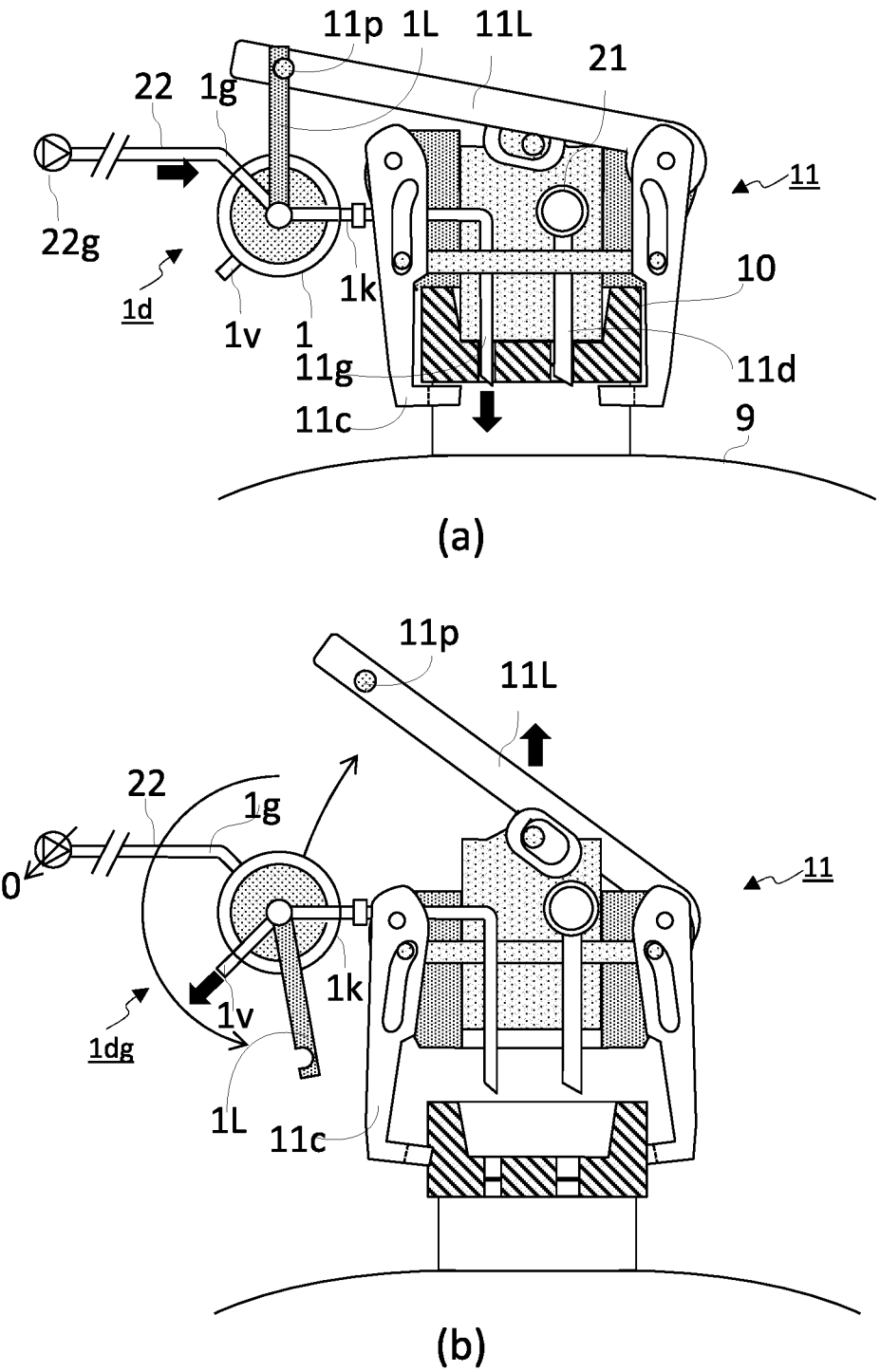
FIG. 9: Illustrates an embodiment of a keg connector comprising a three way valve as defined in the present invention (a) in dispensing position, and (b) in venting position.
Figure 10:
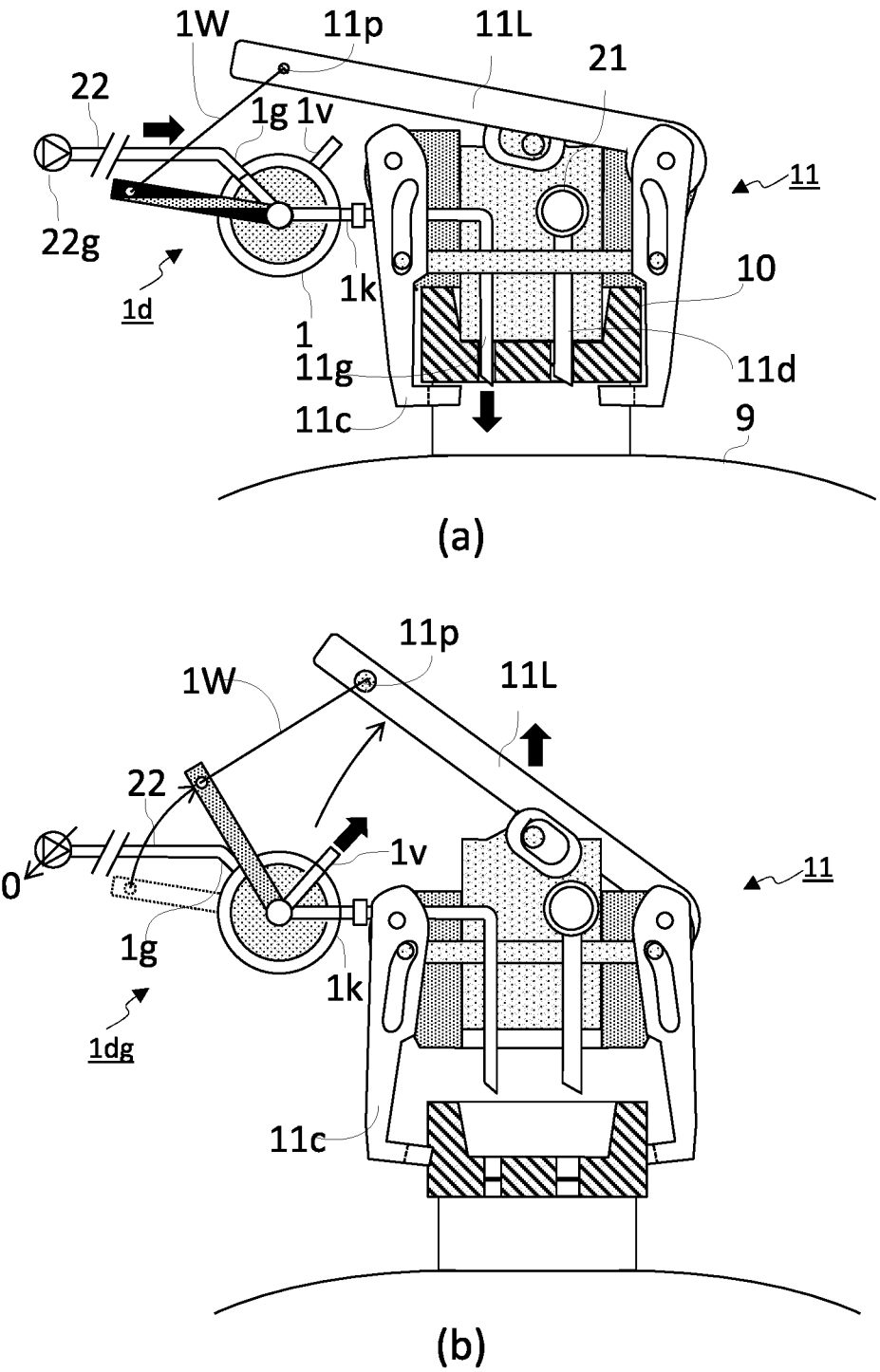
FIG. 10: Illustrates a second embodiment of a keg connector comprising a three way valve as defined in the present invention (a) in dispensing position, and (b) in venting position.

When a keg connector is used, it is usual that it comprises clamping means (11c) for coupling the keg connector to a container (9), said clamping means being actuated by actuating means (11L) from a coupling position (cf. FIGS. 9(a) & 10(a)), wherein the keg connector is coupled to the container to a release position (cf. FIGS. 9(b) & 10(b)), wherein the keg connector can be removed from the container. The actuating means (11L) can be a lever as illustrated in FIGS. 9 & 10, or it can be any other means known in the art, such as snap fits, threaded ring, knob, etc.

In order to prevent an end user from withdrawing the keg connector (11) from an empty container (9) before having vented the interior of the container, it is advantageous if the three way valve is provided with blocking means (1L), such that when the three way valve is in its dispensing position (1d), said blocking means interact with a coupling element (11p) such that the clamping means (11c) of the keg connector cannot be brought from its coupling position to its release position before switching the three way valve from its dispensing position (1d) to its venting position (1dg) to thus release the blocking means from the coupling element (11p). In the embodiment illustrated in FIG. 9, the blocking means (1L) is in the shape of a rotating rod fixed to the rotation axis, X1, provided with a notch, the rotation of said rod allowing the switching of the three way valve from its dispensing position (1d) to its venting position (1dg). The actuating lever (11l of the keg connector comprises a coupling element in the shape of a protruding pin (11p) such that when the actuating lever (11l is in its coupling position and the three way valve is in its dispensing position, the protruding pin (11p) is engaged in the notch of the rotating rod (1L) and the actuating lever cannot be raised to bring the clamping means in their release position (cf. FIG. 9(a)). When it is desired to uncouple the keg connector (11) from the container (9), the rotating rod (1L) must first be rotated to disengage the pin from the notch of the rotating rod. Said rotation actually switches the three way valve from its dispensing position to its venting position, thus balancing the pressure inside the container with atmospheric pressure. With this simple system, the keg connector cannot be uncoupled from the container without venting the inside of the container first.

In an alternative embodiment illustrated in FIG. 10, a three way valve (1) comprises a rotating rod (1L) as discussed above, which rotation switches the three way valve from a dispensing position to a venting position and reverse. As discussed before, when the keg connector (11) is clamped in position at the mouth of the container, the rotating rod (1L) is coupled to the actuating lever (11l of the keg connector, e.g., by means of a rigid wire (1W) or any other coupling means. The difference with the previous embodiment is that when unclamping the keg connector, the rotating rod needs not be disengaged from the actuating lever first. On the contrary, the raising of the actuating lever (11l drives the rotation of the rotating rod (1L) which is still coupled to the actuating lever by means of the wire (1W), switching the three way valve from its dispensing position to its venting position. The advantage of this embodiment over the previous one is that a single move is sufficient for unclamping the keg connector and venting the interior of the container, whilst two moves are required in the former embodiment.

FIG. 11 illustrates a dispensing appliance comprising a container (9) containing a liquid to be dispensed and a mouth sealed by a closure (10) comprising at least one opening allowing an interior of the container to be brought in fluid communication with both dispensing tube (21) and gas duct (1g) of the three way valve, the upstream end of the gas tube being connected to a source of pressurized gas (22g). The storing closet (31) may or may not be cooled with cooling means (31c). Depending on the size of the container (9), it can be stored under the counter or on top of a table top. The source of pressurized gas (22g) illustrated in FIG. 11 is a bottle of pressurized gas, but it can also be a compressor as shown in FIGS. 1, 2, 9, and 10.

A container (9) can be loaded onto a dispensing appliance according to the present invention for dispensing a liquid contained therein, such as a beverage, like beer or any other carbonated beverage, with the following steps:
(a) Providing a container (9) containing a liquid to be dispensed and a mouth sealed by a closure (10) comprising at least one opening; the container is preferably a polymeric container and, more preferably, a polymeric bag-in-container.
(b) Bringing the upstream end of a dispensing tube (21) in fluid communication with an interior of the container through said at least one opening of the closure (10), with the dispensing valve (23v) being in a closed position preventing any flow of liquid therethrough;
(c) Bringing a gas duct (1g) of the three way valve in fluid communication with an interior of the container (9), and connecting the upstream end of the gas tube (22) to a source of pressurized gas (22g),
(d) Switching the three way valve to its dispensing position (1d) to allow pressurized gas to flow into an interior of the container; and
(e) Opening the dispensing valve (23v) to dispense the liquid out of the container through the dispensing tube (21).

Steps (b) and (c) of bringing an interior of the container in fluid communication with the upstream end of the dispensing tube and with the downstream end of the gas tube can advantageously be carried out simultaneously by using a keg connector (11) as illustrated in FIGS. 9 and 10 and as disclosed in WO2014057099 or EP patent application No EP14161266. The upstream end of the dispensing tube (21) is to be coupled to the dispensing channel (11d) of the keg connector. The gas duct (1g) of the three way valve is to be coupled to the gas channel (11g) of the connector. The keg connector (11) thus coupled to the dispensing tube and gas tube can be coupled to the mouth of the container such that both dispensing channel and gas channel bring the interior of the container in fluid communication with the dispensing tube and with the gas tube, respectively.

When it is desired to remove a container from a dispensing appliance according to the present invention, in particular, after the container has been emptied, the container can be removed as follows:
(f) Switching the three way valve from its dispensing position (1d) to its venting position (1dg) to allow the pressure inside the container to drop in balance with the atmospheric pressure, and
(g) Removing the container from the dispensing appliance. If a keg connector is used, it can be uncoupled from the container prior to removing the container.

The interior of the empty container is now in balance with atmospheric pressure. For polymeric container, it can be squeezed without danger and shipped to a recycling facility.

| REF | DESCRIPTION |
|---|---|
| 1d | dispensing position of three way valve |
| 1dg | venting position of three way valve |
| 1g | gas duct in three way valve |
| 11 | housing |
| 1k | keg duct in three way valve |
| 1L | lever for rotating mandrel from dispensing to venting position |
| 1m | rotating mandrel |
| 1r | rotating portion of the three way valve housing, comprising gas duct |
| 1s | static portion of the three way valve housing |
| 1v | vent duct in three way valve |
| 1w | rigid wire |
| 1 | three way valve |
| 2g | gas opening in static portion of the housing |
| 2 | annular gap |
| 4 | channel in rotating core |
| 9b | inner bag of bag-in-container |
| 9s | dispensing spear |
| 9 | container |
| 10 | container closure |
| 11c | clamping means of keg connector |
| 11d | dispensing channel in keg connector |
| 11g | gas channel in keg connector |
| 11L | lever for actuating clamping means of keg connector |
| 11 | keg connector |
| 21v | dispensing valve |
| 21 | dispensing tube |
| 22g | source of pressurized gas |
| 22 | gas tube |
| 23 | dispensing column |
| 31c | cooling means |
| 31 | storing closet |

The invention claimed is:

1. A dispensing appliance for dispensing a liquid contained in a container, comprising:
   (a) A dispensing tube for dispensing the liquid from the container through a dispensing valve, said dispensing tube comprising an upstream end and a downstream end;
   (b) A gas tube for feeding a pressurized gas into the container for driving the dispensing of liquid out of the container through the dispensing tube, said gas tube comprising a downstream end and an upstream end, the latter being connectable to a source of pressurized gas;
   wherein a three way valve is coupled to the downstream end of the gas tube, said three way valve comprising:
   A keg duct suitable for being brought into fluid communication with the interior of the container;
   A gas duct connected to the downstream end of the gas tube; and
   A vent duct;
   and in that, the three way valve can switch from a dispensing position wherein the keg duct is in fluid communication with the gas duct, and out of fluid communication with the vent duct, to a venting position, wherein the keg duct is in fluid communication with the vent duct, and out of fluid communication with the gas duct,
   wherein the three way valve is provided with blocking means, such that when the three way valve is in the dispensing, said blocking means interact with a coupling element such that the clamping means of the keg connector cannot be brought from their coupling position to their release position before switching the three way valve from the dispensing position to the venting position to thus release the blocking means from the coupling element.

2. The dispensing appliance according to claim 1, further comprising a keg connector comprising a dispensing channel suitable for being coupled in fluid communication with the upstream end of the dispensing tube, and comprising a gas channel suitable for being coupled in fluid communication with the keg duct of the three way valve, both dispensing channel and gas channel being suitable for being coupled to a mouth of a container such that the interior of the container is brought in fluid communication with the dispensing tube and with the gas tube, respectively.

3. The dispensing appliance according to claim 2, wherein the keg duct comprises coupling means for reversibly coupling the three way valve to the gas channel of the keg connector, said coupling means being preferably selected from a screwing thread, a bayonet, a snap fit, or a flexible tube portion with a tightening bridle.

4. The dispensing appliance according to claim 2, wherein the keg connector comprises clamping means for coupling the keg connector to a container, said clamping means being actuated by actuating means from a coupling position, wherein the keg connector is coupled to the container to a release position, wherein the keg connector can be removed from the container.

5. The dispensing appliance according to claim 1, wherein the three way valve comprises a rotating mandrel pierced by a channel comprising two openings, said rotating mandrel being rotatingly and snugly mounted in a cavity of a housing, and wherein switching of the three way valve from the dispensing position to the venting position is carried out by rotation about a rotation axis, X1, of said rotating mandrel with respect to the housing and wherein the channel has a geometry such that by rotation of the rotating mandrel about the rotation axis, X1, by a given angle, the rotating mandrel position is switched between fluidly communicating the keg duct with the gas duct thus defining the dispensing position, and fluidly communicating the keg duct with the vent duct, thus defining the vent position (1 dg).

6. The dispensing appliance according to claim 5, wherein the gas duct of the three way valve extends transverse to the rotation axis, X1, and can rotate about said rotation axis, X1.

7. The dispensing appliance according to claim 6, wherein the housing comprises,
   a static portion comprising the vent duct and a gas opening, and
   a rotating portion comprising the gas duct, wherein the rotating portion can rotate about the rotation axis, X1, with respect to the static portion.

8. The dispensing appliance according to claim 7, wherein the three way valve comprises,
   an annular gap extending about the rotation axis, X1, and being in fluid communication with the gas duct, and
   a bridging channel fluidly communicating the annular gap with a gas opening provided in the static portion of the housing, wherein said gas opening can be brought into fluid communication with the channel of the mandrel by rotation of the mandrel to the dispensing position.

9. The dispensing appliance according claim 1, comprising a container containing a liquid to be dispensed and a mouth sealed by a closure comprising at least one opening allowing to bring an interior of the container in fluid communication with both the upstream end of the dispensing tube and the gas duct of the three way valve, the upstream end of the gas tube being connected to a source of pressurized gas.

10. A method for loading and unloading a container onto a dispensing appliance comprising:

(a) Providing a dispensing tube for dispensing the liquid from the container through a dispensing valve, said dispensing tube comprising an upstream end and a downstream end;
(b) Providing a gas tube for feeding a pressurized gas into the container for driving the dispensing of liquid out of the container through the dispensing tube, said gas tube comprising a downstream end and an upstream end, the upstream end being connectable to a source of pressurized gas;
(c) Providing a three way valve is coupled to the downstream end of the gas tube, said three way valve comprising:

A keg duct suitable for being brought into fluid communication with the interior of the container;
A gas duct connected to the downstream end of the gas tube; and
A vent duct;
Such that the three way valve can switch from a dispensing position wherein the keg duct is in fluid communication with the gas duct, and out of fluid communication with the vent duct, to a venting position, wherein the keg duct is in fluid communication with the vent duct, and out of fluid communication with the gas duct,
wherein the three way valve is provided with blocking means, such that when the three way valve is in the dispensing position, said blocking means interact with a coupling element such that the clamping means of the keg connector cannot be brought from their coupling position to their release position before switching the three way valve from the dispensing position to the venting position to thus release the blocking means from the coupling element;
said method further comprising the following steps:
(d) Providing a container containing a liquid to be dispensed and a mouth sealed by a closure comprising at least one opening;
(e) Bringing the upstream end of the dispensing tube in fluid communication with an interior of the container through said at least one opening of the closure, with the dispensing valve being in a closed position preventing any flow of liquid therethrough;
(f) Bringing the gas duct of the three way valve in fluid communication with an interior of the container, and connecting the upstream end of the gas tube to a source of pressurized gas;
(g) Switching the three way valve to the dispensing position to allow pressurized gas to flow into an interior of the container; and
(h) Opening the dispensing valve to dispense the liquid out of the container through the dispensing tube.

11. The method according to claim 10, further comprising the following steps:
   j coupling the upstream end of the dispensing tube to the dispensing channel of the keg connector;
   k coupling the gas duct of the three way valve to the gas channel of the connector; and
   m coupling the keg connector to the mouth of the container such that both dispensing channel and gas channel bring the interior of the container in fluid communication with the dispensing tube and with the gas tube, respectively.

12. The method according to claim 10, wherein the container is removed from the dispensing appliance by:
   j Switching the three way valve from its dispensing position to its venting position to allow the pressure inside the container to drop in balance with the atmospheric pressure, and
   k Removing the container from the dispensing appliance.

13. The method according to claim 10, wherein prior to removing the container from the dispensing appliance, the keg connector is uncoupled from the container.

14. The method according to claim 10, wherein the container is removed from the dispensing appliance by:
   j Switching the three way valve from its dispensing position to its venting position to allow the pressure inside the container to drop in balance with the atmospheric pressure, and
   k Removing the container from the dispensing appliance.

15. The method according to claim 11, wherein prior to removing the container from the dispensing appliance, the keg connector is uncoupled from the container.

\* \* \* \* \*